Figure 1:
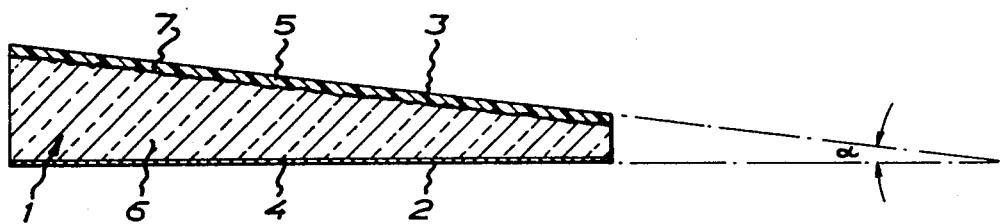

United States Patent [19]

Holmqvist et al.

[11] 3,905,687

[45] Sept. 16, 1975

[54] REARVIEW MIRROR CAPABLE OF BEING DIMMED

[75] Inventors: Per Goran Holmqvist, Vaxjo; Lars Erik Bertil Eliasson, Braäs, both of Sweden

[73] Assignee: AB Braäs Spegelindustri, Braäs, Sweden

[22] Filed: Sept. 25, 1973

[21] Appl. No.: 400,551

[30] Foreign Application Priority Data
Oct. 2, 1972 Sweden.............................. 12684/72

[52] U.S. Cl.................................. 350/281; 350/288
[51] Int. Cl.² ........................ B60R 1/04; G02B 5/08
[58] Field of Search ............................ 350/279–282

[56] References Cited
UNITED STATES PATENTS

| | | | |
|---|---|---|---|
| 3,402,004 | 9/1968 | Warhol................ | 350/281 |
| 3,520,594 | 7/1970 | Kurz..................... | 350/281 |
| 3,748,025 | 7/1973 | Van Putten.......... | 350/280 |

*Primary Examiner*—John K. Corbin
*Attorney, Agent, or Firm*—Bucknam and Archer

[57] ABSTRACT

A rearview mirror for vehicles comprises a transparent plate-shaped body the two opposite faces of which make a small angle with one another and one side of which is covered with a mirror coating. The face of the body directed away from the mirror coating consists of a thin layer of transparent plastics, the rest of the body being glass.

2 Claims, 2 Drawing Figures

REARVIEW MIRROR CAPABLE OF BEING DIMMED

The present invention relates to a mirror to be used as a rearview mirror for vehicles. Such a mirror must possess high reflectivity and not be likely to cause injuries to persons involved in traffic accidents.

The mirror comprises a transparent plate-shaped body, the two opposite faces of which make a small angle with one another and one face of which is covered with a mirror coating. It is characterized in that the face of the body directed away from the mirror coating consists of a thin layer of transparent plastics, the rest of the body being glass. Said plastics layer forms a protective means should the mirror be broken, insofar as splinters from the mirror glass will be unable to pierce it. As the mirror is built up on a glass body it is not susceptible to deformation and thus provides high reflectivity, considering that plastics and glass have approximately the same refractive index. Furthermore, the mirror is cheap to manufacture, since the glass body, the two opposite faces of which make a small angle with each other, can be made from ordinary plane mirror glass in a rough-grinding operation. The face directed toward the plastics layer shall preferably be provided with irregularities, with which the plastics material of the plastics layer engages so as to fixedly adhere said plastics layer to the glass body. Thus fixing the plastics is of great importance, since glass and plastics have different coefficients of expansion.

The invention also relates to a process of manufacturing the mirror. In this process the plastics layer is injected into an injection mould in which the face of the glass body directed away from the mirror coating constitutes one boundary plane of the plastics layer, while a planar side of the injection mould constitutes the other boundary plane of the plastics layer. By this process the plastics layer will be properly fixed to the glass body and at the same time receive so fine a surface that no polishing or finishing thereof is needed.

Figure 2:
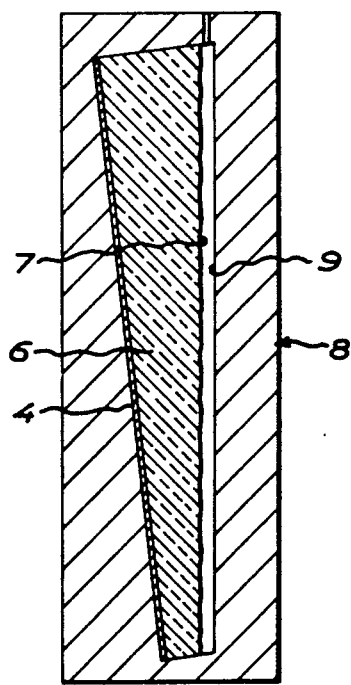

The invention will be more fully described hereinbelow with reference to the accompanying drawing, in which FIG. 1 shows a section of a preferred embodiment of the mirror;

FIG. 2 schematically shows the process by which the mirror is manufactured in the injection mould.

The mirror comprises a transparent, plate-shaped body 1, the two opposite faces 2 and 3 of which make a rather small angle α with one another. In a rearview mirror capable of being dimmed, the angle α shall be 3°17' but may range from 3°10' to 3°25'. The angle α may of course vary within certain limits for different purposes. At the face 2 the body 1 is provided with a mirror coating 4, e.g. metal foil bearing a protective film.

According to the invention, the face 3 of the body 1 directed away from the mirror coating 4 consists of a thin layer 5 of transparent plastics, the rest of the body being a glass body 6.

The face 7 of the glass body 6 directed toward the plastics layer 5 has irregularities, with which the plastics material of the plastics layer 5 engages so as to fix said plastics layer 5 to the glass body 6. The face 7 of the glass body 6 making a rather small angle with the face 2, has suitably been obtained by rough-grinding one face of a plane mirror glass, the other face 2 of which is provided with the mirror coating 4. The face 7 bearing the irregularities may have a depth of profile that varies between broad limits. However, the depth of profile should not normally exceed 50 microns; as a rule it will be significantly smaller. The corresponding thickness of the plastics layer 5 is 0.5 – 0.7 mm but may also vary considerably. The plastics layer 5 is substantially plane-parallel.

As will appear from FIG. 2, the plastics layer 5 shall be sprayed in an injection mould 8 in which the face 7 of the glass body 6 directed away from the mirror coating 4 constitutes one boundary plane of the plastics layer 5, while a planar side 9 of the injection mould 8 constitutes the other boundary plane. In order that the mirror shall have high reflectivity, it is of the utmost importance that the planar side 9 of the injection mould 8 has a very good surface finish.

What we claim and desire to secure by Letters Patent is:

1. In a mirror capable of being dimmed intended for use as a rearview mirror for vehicles in which glass is coated with a plastics layer of approximately the same refractive index, the improvement which comprises a transparent plate-shaped body made of glass, the two opposite faces of which make a small angle with one another and one first face of which is covered with a mirror coating, the second face of the body which is directed away from the mirror coating is covered by a thin layer of transparent plastics, said second face facing the driver, said second face has irregularities with which the plastics material of the plastics layer engages so as to fix said plastics layer to the glass body, the face of the glass body having the irregularities being a roughly ground surface the surface of the plastics layer facing the driver being planar and having a surface finish sufficient to provide high reflectivity for the mirror.

2. A mirror as claimed in claim 1 wherein the plastics layer is substantially plane-parallel.

* * * * *